US012298469B2

(12) United States Patent
Lai et al.

(10) Patent No.: US 12,298,469 B2
(45) Date of Patent: May 13, 2025

(54) SINGLE NANOSTRUCTURE-INTEGRATED METALENS

(71) Applicant: Hong Kong Applied Science and Technology Research Institute Co., Ltd., Shatin (HK)

(72) Inventors: Yunhe Lai, Shatin (HK); Haoyuan Bai, Shatin (HK); Qingyi Yang, Shatin (HK); Jinbo Jiang, Ma On Shan (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 560 days.

(21) Appl. No.: 17/746,508

(22) Filed: May 17, 2022

(65) Prior Publication Data

US 2023/0375747 A1 Nov. 23, 2023

(51) Int. Cl.
*G02B 1/00* (2006.01)
*G02B 27/00* (2006.01)
(Continued)

(52) U.S. Cl.
CPC .......... *G02B 1/002* (2013.01); *G02B 27/0012* (2013.01); *G02B 27/30* (2013.01);
(Continued)

(58) Field of Classification Search
CPC .......... G02B 1/00; G02B 1/002; G02B 1/005; G02B 1/007; G02B 1/18; G02B 27/0012;
(Continued)

(56) References Cited

U.S. PATENT DOCUMENTS 9,092,090 B2  7/2015  Zhang et al.
9,360,935 B2  6/2016  Chan et al.
(Continued)

FOREIGN PATENT DOCUMENTS

CN  205562413 U  9/2016
CN  106094066 A  11/2016
(Continued)

OTHER PUBLICATIONS

China National Intellectual Property Administration, First Office Action issued for Chinese Patent Application No. 202280002164.0, dated Jun. 30, 2023, 11 pages.
(Continued)

*Primary Examiner* — Sultan Chowdhury
(74) *Attorney, Agent, or Firm* — Norton Rose Fulbright US LLP

(57) ABSTRACT

Systems and methods which provide single nanostructure-integrated metalens configurations implementing projector and light shaper functionality are described. A single nanostructure-integrated metalens may comprise an optical substrate having a preconfigured mapping of integrated nanostructures providing metasurfaces for modulating the behaviors of electromagnetic waves to implement a thin, flat lens. A period distance for the nanostructures, a height of the nanostructures, and a quantization for lateral sizes of the nanostructures may be selected for a particular single nanostructure-integrated metalens configuration. A first phase map may be computed with respect to structured light generation and a second phase map may be computed with respect to light collimation, wherein fusion of these phase maps may be used to define a preconfigured mapping for the nanostructures of a single nanostructure-integrated metalens implementation. The phase distribution of the first phase
(Continued)

map may be inverse designed, such as using an inverse phase design technique.

20 Claims, 6 Drawing Sheets

(51) Int. Cl.
  *G02B 27/30* (2006.01)
  *G01B 11/22* (2006.01)
  *G01B 11/25* (2006.01)
(52) U.S. Cl.
  CPC .............. *G01B 11/22* (2013.01); *G01B 11/25* (2013.01); *G02B 2207/101* (2013.01)
(58) Field of Classification Search
  CPC .................. G02B 27/0938; G02B 27/0944; G02B 27/20; G02B 27/30; G02B 27/425; G02B 27/1086; G02B 27/4205; G02B 27/4233; G02B 27/4266; G02B 27/4272; G02B 27/4288; G02B 2207/00; G02B 2207/101; G01B 11/22; G01B 11/24; G01B 11/25; G01B 11/2509; G01B 11/2513; G01B 11/2527; G01B 11/2531; G01B 11/2536; G01B 11/2545
  See application file for complete search history.

(56) References Cited

U.S. PATENT DOCUMENTS

| | | |
|---|---|---|
| 9,857,919 B2 | 1/2018 | Zhang |
| 9,970,884 B1 | 5/2018 | Nikitin et al. |
| 10,148,941 B2 | 12/2018 | Shpunt et al. |
| 10,378,887 B2 | 8/2019 | Na et al. |
| 10,408,419 B2 | 9/2019 | Aieta et al. |
| 10,564,716 B2 | 2/2020 | Zhang et al. |
| 10,887,500 B2 | 1/2021 | Wu et al. |
| 10,971,900 B2 | 4/2021 | Wang et al. |
| 11,085,609 B1 | 8/2021 | Cheng |
| 11,092,717 B2 | 8/2021 | Capasso et al. |
| 11,092,727 B2 | 8/2021 | Smith et al. |
| 11,333,614 B2 | 5/2022 | Chen et al. |
| 11,431,881 B2 | 8/2022 | Taylor et al. |
| 11,543,564 B2 | 1/2023 | Chen et al. |
| 2013/0208273 A1* | 8/2013 | Dominguez-Caballero ................ G02F 1/133609 349/97 |
| 2015/0193978 A1 | 7/2015 | Wu et al. |
| 2018/0216797 A1 | 8/2018 | Khorasaninejad et al. |
| 2019/0033683 A1 | 1/2019 | Ahmed et al. |
| 2019/0049632 A1 | 2/2019 | Shin et al. |
| 2019/0137665 A1* | 5/2019 | You .................... G03B 21/2033 |
| 2019/0154877 A1* | 5/2019 | Capasso .................. G02B 5/18 |
| 2019/0383969 A1 | 12/2019 | Badano et al. |
| 2020/0004036 A1 | 1/2020 | Sales et al. |
| 2020/0025985 A1 | 1/2020 | Teissier et al. |
| 2020/0201061 A1 | 6/2020 | Mor |
| 2020/0225386 A1* | 7/2020 | Tsai ....................... G02B 1/002 |
| 2020/0393599 A1 | 12/2020 | Fu et al. |
| 2021/0068665 A1 | 3/2021 | Pahlevaninezhad et al. |
| 2021/0149081 A1 | 5/2021 | Groever et al. |
| 2021/0247549 A1 | 8/2021 | Park et al. |
| 2021/0286189 A1 | 9/2021 | Ghosh et al. |
| 2021/0311379 A1 | 10/2021 | Park et al. |
| 2021/0318516 A1 | 10/2021 | Han et al. |
| 2022/0011161 A1 | 1/2022 | Han et al. |
| 2022/0048764 A1 | 2/2022 | Chen et al. |
| 2022/0078318 A1 | 3/2022 | Wang et al. |
| 2022/0082731 A1 | 3/2022 | Mun et al. |
| 2022/0086319 A1 | 3/2022 | Yen |
| 2022/0137226 A1 | 5/2022 | Kim et al. |
| 2022/0196480 A1 | 6/2022 | Ang et al. |
| 2022/0225386 A1 | 7/2022 | Salah |
| 2022/0228918 A1 | 7/2022 | Busnaina et al. |
| 2022/0252761 A1* | 8/2022 | Xia ..................... G03F 7/70416 |
| 2022/0260754 A1 | 8/2022 | Dobashi |
| 2022/0360698 A1 | 11/2022 | Taylor et al. |

FOREIGN PATENT DOCUMENTS

| | | |
|---|---|---|
| CN | 107703579 A | 2/2018 |
| CN | 108291983 A | 7/2018 |
| CN | 109196387 A | 1/2019 |
| CN | 110609386 A | 12/2019 |
| CN | 112505808 A | 3/2021 |
| CN | 112558293 A | 3/2021 |
| CN | 112684522 A | 4/2021 |
| CN | 111722392 B | 6/2021 |
| CN | 113258428 A | 8/2021 |
| CN | 113296381 A | 8/2021 |
| CN | 113671612 A † | 8/2021 |
| CN | 214098104 U | 8/2021 |
| CN | 113671613 A | 11/2021 |
| CN | 113809553 A | 12/2021 |
| CN | 215005942 U | 12/2021 |
| CN | 113917578 A | 1/2022 |
| CN | 114002768 A | 2/2022 |
| CN | 114072646 A | 2/2022 |
| CN | 114280703 A | 4/2022 |
| CN | 114449139 A | 5/2022 |
| CN | 115136035 A | 9/2022 |
| CN | 217467355 U | 9/2022 |
| CN | 217639611 U | 10/2022 |
| CN | 217639612 U | 10/2022 |
| CN | 217639613 U | 10/2022 |
| CN | 217820839 U | 11/2022 |
| CN | 217821058 U | 11/2022 |
| CN | 217982120 U | 12/2022 |
| EP | 3968059 A1 | 3/2022 |
| EP | 3980838 A1 | 4/2022 |
| KR | 10-20210006842 A | 1/2021 |
| KR | 102262913 B1 | 6/2021 |
| KR | 10-20210128927 A | 10/2021 |
| KR | 10-20220104507 A | 7/2022 |
| KR | 10-20220138933 A | 10/2022 |
| WO | WO-2018204856 A1 | 11/2018 |
| WO | WO-2021212811 A1 | 10/2021 |
| WO | WO-2021233416 A1 | 11/2021 |
| WO | WO-2021233831 A1 | 11/2021 |
| WO | WO-2022007738 A1 | 1/2022 |
| WO | WO-2022051971 A1 | 3/2022 |
| WO | WO-2022170048 A2 | 8/2022 |
| WO | WO-2022183094 A1 | 9/2022 |
| WO | WO-2022228231 A1 | 11/2022 |
| WO | WO-2022235826 A2 | 11/2022 |
| WO | WO-2022263259 A1 | 12/2022 |
| WO | WO-2022263296 A1 | 12/2022 |
| WO | WO-2023283270 A1 | 1/2023 |
| WO | WO-2023283348 A1 | 1/2023 |
| WO | 2023024381 † | 3/2023 |

OTHER PUBLICATIONS

China National Intellectual Property Administration, Second Office Action issued for Chinese Patent Application No. 202280002164.0, dated Sep. 8, 2023, 12 pages.

Lee, G.Y.; Hong, J.Y.; Hwang, S.; Moon, S.; Kang, H.; Jeon, S.; Kim, H.; Jeong, J.-H.; Lee, B. Metasurface eyepiece for augmented reality. Nat. Commun. 2018, 9, 4562.

Li, Z.; Lin, P.; Huang, Y.W.; Park, J.S.; Chen, W.T.; Shi, Z.; Qiu, C.-W.; Cheng, J.-X.; Capasso, F. Meta-optics achieves RGB-achromatic focusing for virtual reality. Sci. Adv. 2021, 7, eabe4458.

L. Li, Z. Liu, X. Ren, S. Wang, V.-C. Su, M.-K. Chen, C.H. Chu, H.Y. Kuo, B. Liu, W. Zang, et al. Metalens-array-based high-dimensional and multiphoton quantum source. Science 2020, 368, 1487-1490.

Patent Cooperation Treaty, International Search Report and Written Opinion issued for PCT Application No. PCT/CN2022/095158, dated Feb. 16, 2023, 9 pages.

(56) References Cited

OTHER PUBLICATIONS

Patent Cooperation Treaty, International Search Report and Written Opinion issued for PCT Application No. PCT/CN2023/116061, dated May 9, 2024, 8 pages.

Gerchberg, R. W. et al. "A Practical Algorithm for the Determination of Phase from Image and Diffraction Plane Pictures," Optik, vol. 35, No. 2, 1972, 6 pages.

Xie, Yi-Yang, et al., Metasurface-integrated vertical cavity surface-emitting lasers for programmable directional lasing emissions. Nature Nanotechnology 2020, 15.2, 125-130.†

\* cited by examiner
† cited by third party

SINGLE NANOSTRUCTURE-INTEGRATED METALENS

TECHNICAL FIELD

The present invention relates generally to optical lenses and, more specifically, to single nanostructure-integrated metalens configurations.

BACKGROUND OF THE INVENTION

Various forms of optical sensors, such as for use in imaging, ranging, depth detection, etc., have entered into relatively widespread use. For example, optical sensors using a semiconductor-based sensor array have been increasingly used in mobile devices. Mobile devices, such as smartphones, tablet devices, notebook computers, and even smartwatches, often include semiconductor-based optical sensor devices in the form of one or more cameras. Additionally, such mobile devices often include some form of include semiconductor-based optical sensor device for light detection and ranging (e.g., using light detection and ranging (LiDAR) for face scanning and/or other depth mapping tasks).

A goal in the implementation of semiconductor-based optical sensor devices is often miniaturization, particularly when the implementation is with respect to a mobile device. It is difficult, however, to reduce the thickness of optical sensor devices. For example, optical lenses are traditionally included in optical sensor devices, wherein the curvature of the lens controls the optical performance of the optical sensor device. The refractive power of the lens increases as the radius of curvature of the lens and, correspondingly, the refractive power of the lens increases as the radius of curvature decreases. This is because the thickness of the lens in an optical axis direction increases as the radius of curvature decreases. Miniaturization of an optical sensor device utilizing such a lens is, thus, subject to the thickness of the lens for providing the necessary optical performance.

In recent years, diffractive optical elements (DOEs), in which micro structured surface relief patterns cause light diffraction, have begun to be adopted for use with respect to optical sensor devices (e.g., for providing structured light generation with respect to optical sensor devices). A DOE is comprised of a thin plate having micro-optic diffractive structures disposed in a predetermined mapping thereon configured to impose a certain spatial pattern of optical phase changes on an incident light beam. The micro-optic diffractive structures of a DOE modify the phase of incident light with the height of the structures (e.g., the thicker the material is forming a micro-optic diffractive structure, the larger the phase rotation provided by that micro-optic diffractive structure). This aspect of DOE implementations results in high costs (e.g., requires multiple fabrication steps to achieve the different structure heights) to achieve higher phase levels.

Metalens configurations, in which metasurfaces modulate the behaviors of electromagnetic waves and increase the effective optical path by the optical resonance of the nanostructures, have begun to receive attention for use with respect to optical sensor devices. However, such metalens configurations often require a collimation lens in addition to the metalens, which increases the overall thickness of the optical sensor device and presents a limitation on miniaturization. Further exasperating their suitability for miniaturization, some metalens configurations utilize mirrors to extend the light path, adding not only size, but also cost and complexity to an optical illumination device implementation. Metalens configurations considered for optical illumination devices have typically provided configurations in which the nanostructures are easily damaged, such as through their being exposed externally to the lens system. Further, many metalens designs are limited to particular forms of structured light or pseudo-random patterns due to their design constraints.

An example of a metalens configuration proposed for structured light projection is described in United States patent publication US20210311379. In metalens embodiments of US20210311379, nanostructures having different sizes provide phase modification of a sub-cell, wherein different sub-cells are used in forming a super cell. One super cell produces one pattern of structured light (e.g., dot), and the super cell is duplicated over the metalens to provide the final pseudo-random projected patterns. The freedom of the phase offsets is limited by the super cell construction, limiting the design of the projected pattern. Further, configuration provides for the nanostructure facing outwards, decreasing the durability of the resulting metalens.

BRIEF SUMMARY OF THE INVENTION

The present invention is directed to systems and methods which provide single nanostructure-integrated metalens configurations. In accordance with embodiments of the invention, a single metalens provides projector and light shaper functionality. For example, a single metalens of some examples may both provide light collimation functionality and structured light projection functionality.

A single nanostructure-integrated metalens configuration of embodiments comprises an optical substrate having a preconfigured mapping of integrated nanostructures providing metasurfaces for modulating the behaviors of electromagnetic waves to implement a thin, flat lens. In accordance with some examples, single nanostructure-integrated metalens configurations may provide arbitrary patterns and relatively wide fields of view. Implementations of a single nanostructure-integrated metalens of embodiments of the invention are well suited for use in various optical sensor devices. For example, a single nanostructure-integrated metalens according to concepts herein may be utilized in a projector/light shaper implementation, such as to provide structured light for various depth mapping tasks. According to embodiments, a single nanostructure-integrated metalens configuration may be utilized as a projector and light shaper of a three-dimensional (3D) sensing apparatus.

Various corporeal aspects with respect to the nanostructure for a single nanostructure-integrated metalens configuration may be selected. For example, a form of nanostructure (e.g., one or more forms of nanostructures, such as nano cube, nano cuboid, nano cylinder, nano elliptic cylinder, etc.) may be selected for use with respect to a particular single nanostructure-integrated metalens. Additionally or alternatively, a period distance for the nanostructures (e.g., a center distance with respect to adjacent nanostructures such that adjacent nanostructures are spaced according to the period distance), a height of the nanostructures, and a lateral size of the nanostructures may be selected for a particular single nanostructure-integrated metalens configuration. In accordance with some examples, the period distance may be selected based at least in part on the wavelength of light with respect to the operation wavelength region of the single nanostructure-integrated metalens. The period distance for the nanostructures may additionally be selected according to some examples based upon considerations such as the flexibility of the phase design, the field of vision, the fabrication difficulty etc. The height of the nanostructures may be selected base at least in part on the wavelength of light with respect to the operation wavelength region of the single nanostructure-integrated metalens, wherein all nanostructures of a single nanostructure-integrated metalens implementation have a same height according to some embodiments. Lateral size of the nanostructures of embodiments may be selected as a plurality of quantized lateral sizes for the nanostructures (e.g., 2, 4, 6, 8, 12, 16, etc. different lateral sizes, corresponding to the number of phase levels to be implemented), wherein the period distance for the nanostructures of some examples provides an upper boundary on the lateral size of the nanostructures.

Embodiments of a single nanostructure-integrated metalens utilize fusion of a plurality of phase maps to define a preconfigured mapping for the nanostructures of a single nanostructure-integrated metalens providing desired spatial pattern of optical phase changes with respect to incident light. For example, a first phase map may be computed with respect to structured light generation by a single nanostructure-integrated metalens and a second phase map may be computed with respect to light collimation by the single nanostructure-integrated metalens. According to some examples, a first phase map may be computed with respect to structured light generation using an inverse phase design technique. A second phase map may be computed with respect to light collimation using a phase focusing design technique according to some examples. The fusion of a first and second phase map to compute a preconfigured mapping for the nanostructures of a single nanostructure-integrated metalens for providing light collimation functionality and structured light projection functionality of embodiments may be performed using a convolution function.

Single nanostructure-integrated metalens configurations of embodiments may be implemented in a variety of optical sensor devices. According to some examples, a projector/light shaper implementation may comprise an apparatus having a single nanostructure-integrated metalens for the projection of structured light, such as dot patterns (e.g., projection of dot patterns of light at the near infrared region). The phase distribution of the single nanostructure-integrated metalens may be inverse designed, such as using an inverse phase design technique, facilitating free form phase design of the structured light. The single nanostructure-integrated metalens of embodiments is configured to produce structured light, wherein collimation functionality is integrated into the single nanostructure-integrated metalens. Accordingly, embodiments may utilize no additional optical elements (e.g., separate collimator, mirror, etc.) in association with the single nanostructure-integrated metalens, facilitating a short total track length with respect to the apparatus and a lower number and cost of components in the apparatus. The apparatus may, for example, comprise a light emission device with a plurality of light emission sources (e.g., 100 or more light emission sources) on the same plane and with the same wavelength (e.g., $\lambda_c$). A barrel or other lens support structure may be included in the apparatus to hold the single nanostructure-integrated metalens at a desired, predetermined position above the light emission plane (e.g., in the range of 1.1 to 1.7 mm above the light emission plane). The signal nanostructure-integrated metalens of the apparatus of embodiments is configured with nanostructures integrated on an optical substrate to transfer light emitted by the light emission device into desired directions, wherein at least one side of the optical substrate deposited with nanostructures faces towards the inner side of the apparatus. Nanostructures of embodiments of a single nanostructure-integrated metalens may thus be disposed inside the apparatus, such as for providing protection with respect to the nanostructures.

The foregoing has outlined rather broadly the features and technical advantages of the present disclosure in order that the detailed description that follows may be better understood. Additional features and advantages will be described hereinafter which form the subject of the claims herein. It should be appreciated by those skilled in the art that the conception and specific embodiments disclosed may be readily utilized as a basis for modifying or designing other structures for carrying out the same purposes of the present designs. It should also be realized by those skilled in the art that such equivalent constructions do not depart from the spirit and scope as set forth in the appended claims. The novel features which are believed to be characteristic of the designs disclosed herein, both as to the organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawing, in which.

DETAILED DESCRIPTION OF THE INVENTION

Figure 1A:
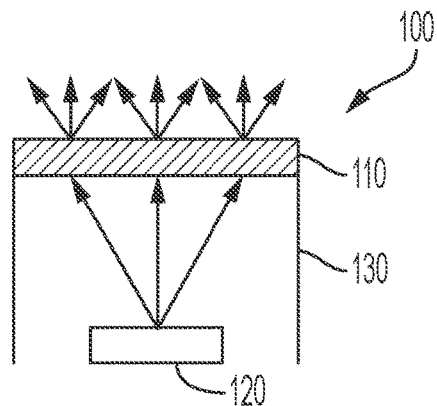
FIG. 1A is a projector device comprising a single nanostructure-integrated metalens configuration according to embodiments of the invention.

FIG. 1A shows an example embodiment of a single nanostructure-integrated metalens configuration in accordance with concepts of the present invention. In particular, FIG. 1A illustrates and example embodiment of projector device 100 comprising single nanostructure-integrated metalens 110, light emission device 120, and support structure 130. Projector device 100 including light emission device 120 and juxtaposed single nanostructure-integrated metalens 110 of the illustrated embodiment may, for example, be utilized as a light projector apparatus in various optical sensor devices, such as to provide structured light for three-dimensional (3D) or depth sensing.

Support structure 130 provides structural support to hold single nanostructure-integrated metalens 110 in a desired predetermined relationship with a light plane of light emission device 120. A distance at which a single nanostructure-integrated metalens is held from a light plane of a light emission device may comprise a balance of various considerations. For example, a shorter distance may increase the distortion of the projected pattern, while a longer distance results in a larger area of the metalens and therefore may increase the formfactor and cost. Support structure 130 of embodiments of single nanostructure-integrated metalens 110 may be configured to position the lens plane of single nanostructure-integrated metalens 110 a distance from the light plane of light emission device 120 selected to be large enough to facilitate generation of desired structured light (e.g., a focal distance for one or more aspects of the metalens) and small enough to support a small formfactor apparatus. In accordance with some embodiments, support structure 130 may position the lens plane of single nanostructure-integrated metalens 110 a distance in the range of 1.1 to 4.5 mm (e.g., a distance in the range of 1.1 to 1.7 mm according to some embodiments) from the light plane of light emission device 120.

Embodiments of support structure 130 may comprise a barrel (e.g., circular cylinder or ellipsoid cylinder wall open at both ends), a box (e.g., square or rectangular walls open at both ends), or other configuration providing mechanical means having a lumen allowing adequate light passage and configured to support single nanostructure-integrated metalens 110 in juxtaposition with light emission device 120. In accordance with some examples, support structure 130 is configured to engage an optical substrate of single nanostructure-integrated metalens 110 at a periphery of the optical substrate (e.g., around the circumference of the optical substrate, at an outer edge of a surface of the optical substrate immediately adjacent to the circumference of the optical substrate, etc.) selected so as to avoid damage of metastructures integrated on the surface of the optical substrate facing light emission device 120.

Light emission device 120 may comprise one or more light sources. For example, light emission device 120 may comprise a single light source, such as a single instance of a light emitting diode (LED), electroluminescent (EL) lamp, etc. Implementations having one light source may be utilized to generate one designed pattern, as described in further detail below. According to some embodiments, light emission device 120 may comprise a plurality of light sources, such as an array of LEDs. Implementations having a plurality of light sources may be utilized to duplicate the pattern with a small shift in the far field, as described in further detail below. The light source(s) of light emission device 120 of embodiments may emit light of a desired wavelength (e.g., light in the near infrared region), such as by emission of light of a single frequency, light of a relatively narrow band (e.g., 100 nm band or less) having a center wavelength ($\lambda_c$) at the desired wavelength, etc., for supplying incident light upon single nanostructure-integrated metalens 110.

Single nanostructure-integrated metalens 110 of embodiments provides a thin, flat lens configuration adapted for the projection of structured light, such as dot patterns (e.g., projection of dot patterns of light at the near infrared region). Single nanostructure-integrated metalens 110 comprises an optical substrate (e.g., a transparent substrate with a transparent spectral range of at least 50 nm corresponding to the center wavelength of the operation wavelength of an associated light source, such as 50 nm or greater transparent spectral range centered at the center frequency of light emission device 120), such as may comprise optical glass, quartz, fused silica, plastic, etc. The optical substrate of single nanostructure-integrated metalens 110 of embodiments has a preconfigured mapping of integrated nanostructures (e.g., nano cubes, nano cuboids, nano cylinders, nano elliptic cylinders, etc. of different, quantized lateral sizes) integrated thereon. The nanostructures may be comprised of various materials, such as dielectric material (e.g., silicon (Si), silicon nitride (SiN), gallium nitride (GaN), titanium dioxide ($TiO_2$), etc.), plasmonic metallic materials (e.g. materials including gold (Au), silver (Ag), platinum (Pt), and/or Palladium (Pd)), and/or other materials providing optical properties for modulating the behaviors of electromagnetic waves. In accordance with embodiments of single nanostructure-integrated metalens 110, the optical substrate is oriented such that a surface of the optical substrate upon which nanostructures are disposed upon faces light emission device 120 (e.g., a surface of the optical substrate having integrated nanostructures is incarcerated within a lumen of support structure 130, providing protection to the nanostructures of that surface).

Figure 1B:
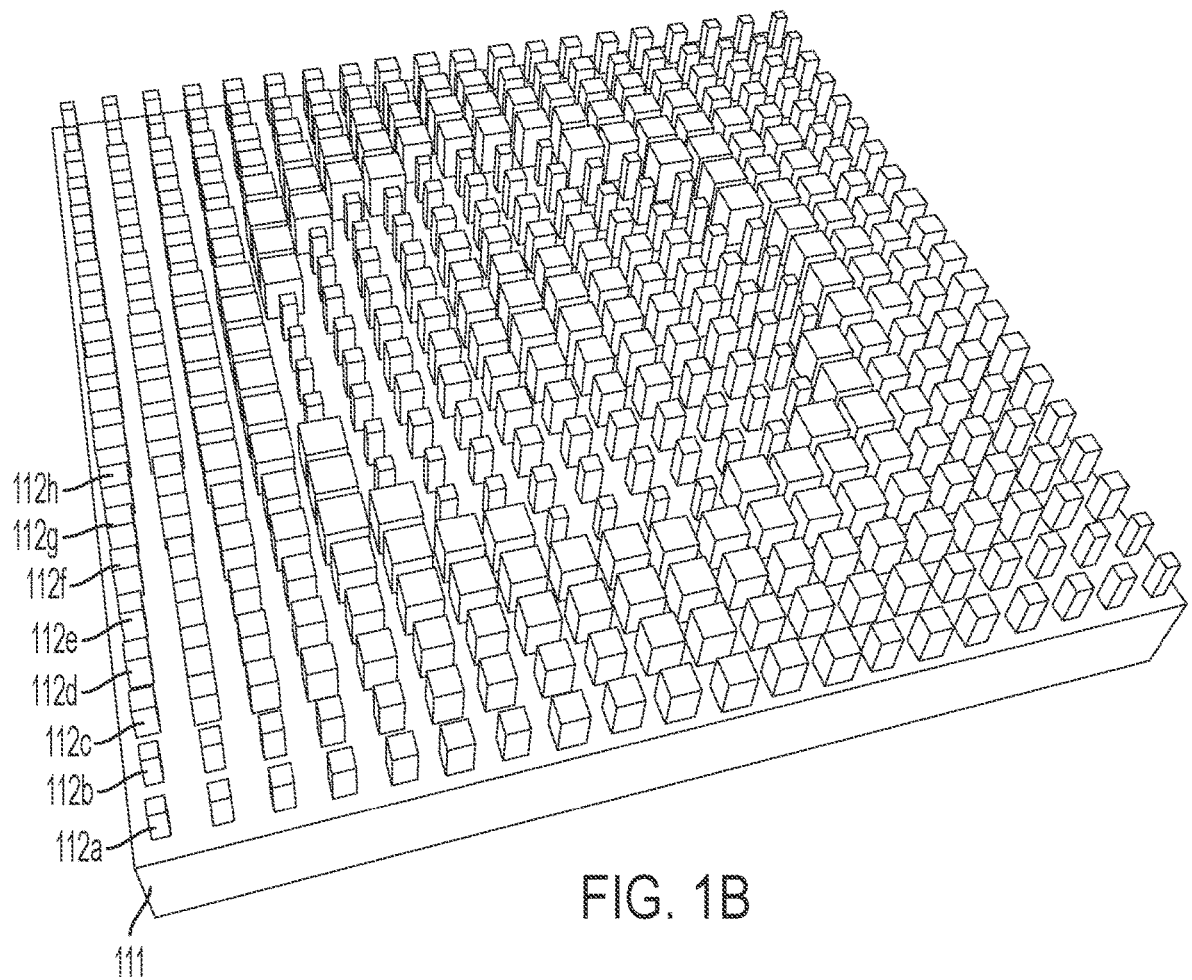
FIG. 1B is an isometric view of a single nanostructure-integrated metalens implementation according to embodiments of the invention.

FIG. 1B shows an example embodiment of single nanostructure-integrated metalens 110 comprising optical substrate 111 having nanostructures 112 (shown as nanostructures 112a-112h having 8 different quantized lateral sizes, corresponding to 8 phase levels to be implemented in the illustrated example, arranged in a predetermined mapping configured to impose a certain spatial pattern of optical phase changes on incident light) integrated on a surface of the optical substrate. It should be appreciated that, although the example of FIG. 1B shows nanostructures disposed on the surface of one side of optical substrate 111, nanostructures of a same or different configuration disposed in a same or different predetermined mapping may additionally be disposed on the surface of the opposite side of the optical substrate of some embodiments of the invention.

As should be appreciated from the illustration of FIG. 1A, the example implementation of projector device 100 comprises single nanostructure-integrated metalens 110 as the only optical element. That is, no optical elements (e.g., collimator(s), concentrator(s), mirror(s), etc.) are provided in the light path between light emission device 120 and single nanostructure-integrated metalens 110 of the illustrated embodiments, facilitating a short total track length with respect to projector device 100. In operation according to embodiments of the invention, single nano-structure-integrated metalens 110 provides projector and light shaper functionality, such as to provide both light collimation functionality and structured light projection functionality (e.g., a collimation function is integrated with a light shaper function in a single nanostructure-integrated metalens configuration). For example, as described in further detail below, mapping and corporeal aspects (e.g., nanostructure materials, form of nanostructures, period distance for the nanostructures, height of the nanostructures, and/or a lateral size of the nanostructures) with respect to nanostructures 112 are selected and/or configured for implementing desired projector and light shaper functionality according to embodiments of the invention. In accordance with some examples, configurations of single nanostructure-integrated metalens 110 may provide arbitrary patterns and relatively wide fields of view (e.g., field of view 60° or greater). In operation according to embodiments, single nanostructure-integrated metalens 110 may be utilized in a projector/light shaper implementation, such as to provide structured light for various depth mapping tasks (e.g., utilized as a projector and light shaper of a three-dimensional (3D) sensing apparatus).

Figure 2:
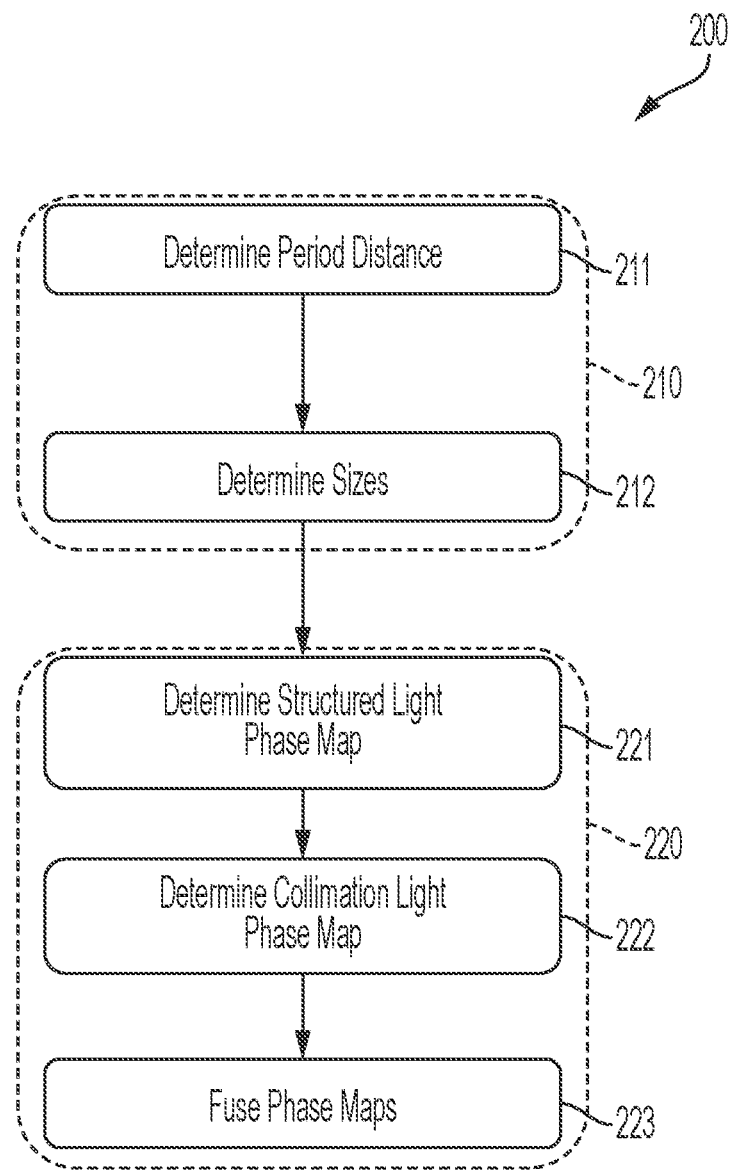
FIG. 2 is a flow diagram of operations implemented with respect to configuring embodiments of a single nanostructure-integrated metalens according to embodiments of the invention.

FIG. 2 shows a flow diagram of operations implemented with respect to configuring embodiments of a single nanostructure-integrated metalens according to concepts of the present invention. In particular, flow 200 provides exemplary operations as may be utilized in configuring implementations of single nanostructure-integrated metalens 110 to provide both light collimation functionality and structured light projection functionality in accordance with embodiments of the invention.

Operations of flow 200 may, for example be performed by one or more processor-based systems operating under control of instruction sets (e.g., computer executed logic, such as software, firmware, etc.) configured to provide operation as described herein. Such processor-based systems may comprise one or more processors, such as a CORE or PENTIUM processor; requisite computer/processor readable memory, such as random access memory (RAM), read only memory (ROM), flash memory, disk memory, solid state disk (SSD) memory, optical memory, and/or the like; and input/output components, such as display, network interface card (NIC), keyboard, digital pointer, printer, and/or the like; coupled to a processor of the one or more processors via a data bus and operable to provide functionality as described herein.

Block 210 of flow 200 illustrated in FIG. 2 provides operations for selecting or otherwise determining corporeal aspects with respect to the nanostructures for a particular configuration of single nanostructure-integrated metalens 110. For example, at block 211 of the illustrated embodiment a period distance for the nanostructures (e.g., a center distance with respect to adjacent nanostructures) is determined. At block 212 of the illustrated embodiment sizes of the nanostructures (e.g., height and lateral sizes) is determined. Corporeal aspects in addition or in the alternative to the foregoing may be selected or otherwise determined at block 210 of embodiments, such as a form of nanostructure (e.g., one or more forms of nanostructures, such as nano cube, nano cuboid, nano cylinder, nano elliptic cylinder, etc.), a nanostructure material (e.g., particular dielectric, plasmonic metallic material, and/or material providing a particular refractive index), etc. In accordance with embodiments of the invention, nanostructure materials having a refractive index not smaller than 1.5 (e.g., n≥1.5) for light at the operation wavelength region of the single nanostructure-integrated metalens (e.g., in an example of a near infrared implementation using light having a wavelength of 940 nm, silicon, providing a refractive index of 3.5-3.75, may be selected for the nanostructure material of an implementation).

Figure 3A:
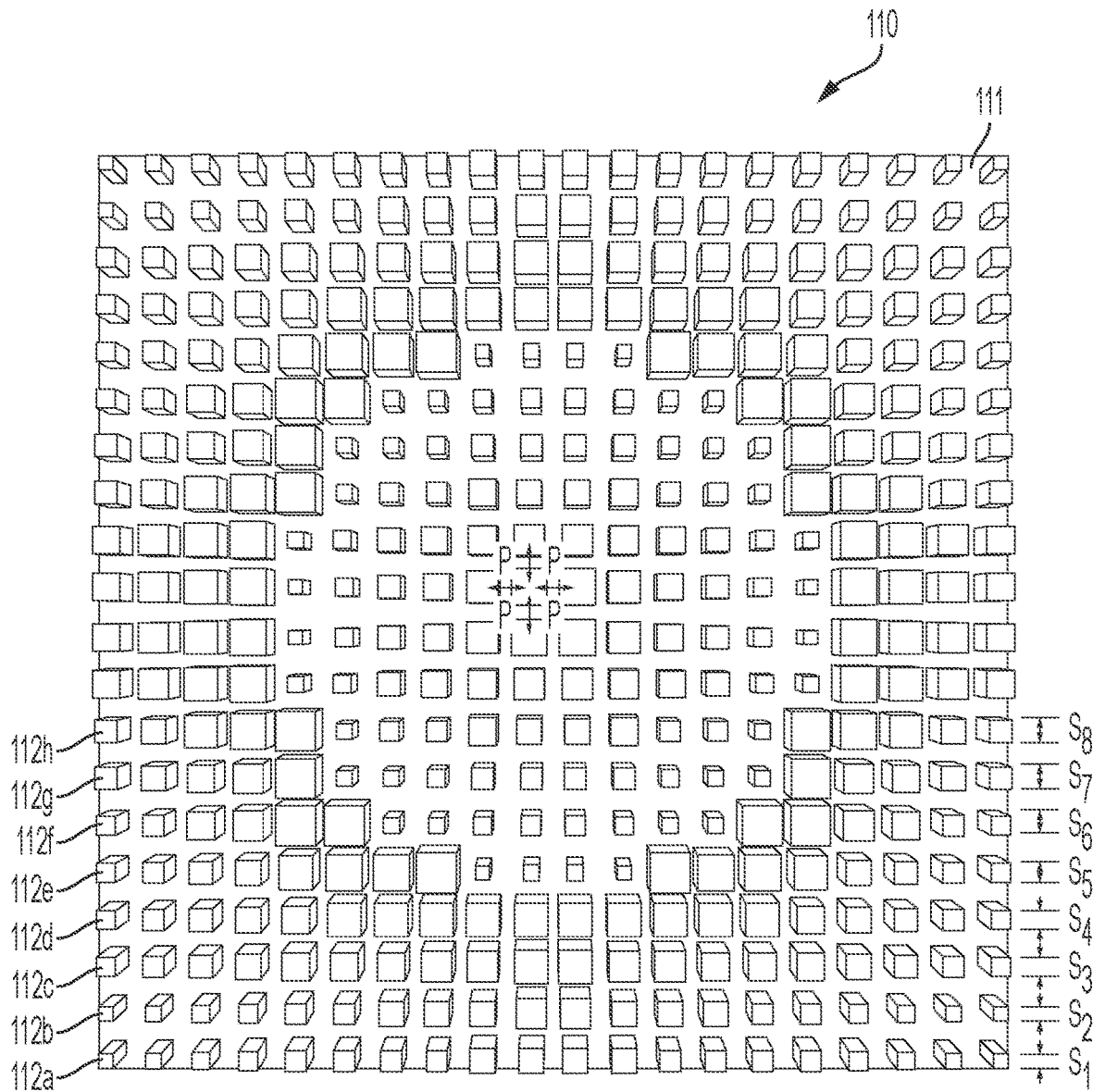
FIG. 3A is a plan view of a single nanostructure-integrated metalens implementation according to embodiments of the invention.
Figure 3B:
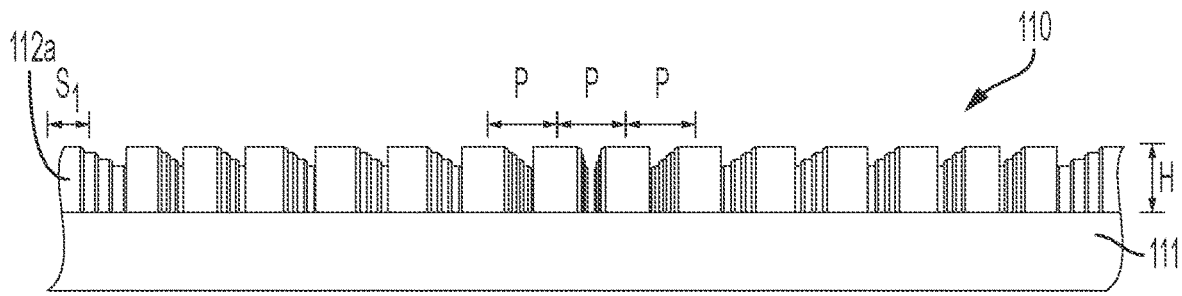
FIG. 3B is a side view of a single nanostructure-integrated metalens implementation according to embodiments of the invention.

A period distance (P) utilized according to examples is a row-to-row and column-to-column (e.g., perpendicular first and second axes) center distance implemented with respect to adjacent ones of nanostructures 112, as illustrated in FIGS. 3A and 3B. In operation according to block 211 of embodiments of the invention, a period distance for the nanostructures is determined based at least in part on the wavelength of light with respect to the operation wavelength region of single nanostructure-integrated metalens 110. For example, the period distance may be selected in correspondence to the center wavelength ($\lambda_c$) of the operation wavelength region of the single nanostructure-integrated metalens (e.g., $\lambda_c$=940 nm in an exemplary near infrared implementation). According to some examples of the invention, the period distance may be selected to fall within a range defined by the center wavelength of the operation wavelength region of the single nanostructure-integrated metalens (e.g., $((\lambda_c*1.2)/2) \geq P \geq (\lambda_c/2)$ or $((\lambda_c*1.2)/2) \geq P \geq ((\lambda_c*0.8)/2)$). The period distance may, for example, be in the range of 400-550 nm in some examples of providing structured light for 3D or depth sensing (e.g., the period distance, P, may be selected to be 500 nm in an example of the above mentioned near infrared implementation in which the center wavelength, $\lambda_c$, is 940 nm). The particular value for the period distance in the aforementioned range may, for example, be selected according to some examples based upon considerations such as the flexibility of the phase design, the field of vision, the fabrication difficulty etc. with respect to the configuration of single nanostructure-integrated metalens 110. In accordance with embodiments of the invention, the period distance utilized with respect to each nanostructure of a particular mapping of nanostructures (e.g., all nanostructures on a first surface of the optical substrate) of single nanostructure-integrated metalens 110, irrespective of the lateral size(s) of the adjacent nanostructures, is equal. Accordingly, a period distance of embodiments provides an upper boundary on the lateral size of those nanostructures.

A height (H) of the nanostructures, as illustrated in FIG. 3B, is the fabrication depth of the nanostructures according to examples. In operation according to block 212 of embodiments of the invention, determining sizes of the nanostructures may include determining a height for the nanostructures based at least in part on the wavelength of light with respect to the operation wavelength region of single nanostructure-integrated metalens 110. For example, the height may be selected in correspondence to the center wavelength ($\lambda_c$) of the operation wavelength region of the single nanostructure-integrated metalens (e.g., $\lambda_c$=940 nm in the above mentioned exemplary near infrared implementation). According to some examples of the invention, the height may be selected to fall within a range defined by the center wavelength of the operation wavelength region of the single nanostructure-integrated metalens (e.g., $(\lambda_c/10) \geq H \geq \lambda_c$). The height may, for example, be in the range of 100-800 nm in some examples of providing structured light for 3D or depth sensing (e.g., the height, H, may be selected to be 490 nm in an example of the above mentioned near infrared implementation in which the center wavelength, $\lambda_c$, is 940 nm). The particular value for the height may, for example, be selected according to some examples based upon considerations such as the desired or acceptable performance of single nanostructure-integrated metalens 110, ease or difficulty of fabrication of the single nanostructure-integrated metalens, etc. In accordance with embodiments of the invention, the height utilized with respect to each nanostructure of a particular mapping of nanostructures (e.g., all nanostructures on a first surface of the optical substrate) of single nanostructure-integrated metalens 110, irrespective of the lateral size(s) of the adjacent nanostructures, is equal.

A lateral size (S) of the nanostructures, as illustrated in FIGS. 3A and 3B, is the size of a respective nanostructure in the plane of the optical substrate upon which the nanostructure is integrated. For example, the lateral size of the nanostructures of embodiments may each comprise a lateral size of a plurality of quantized lateral sizes for the nanostructures (e.g., 2, 4, 6, 8, 12, 16, etc. different lateral sizes). That is, nanostructures with different lateral sizes modify incident light with different values of phase shift levels. According to embodiments, the number of lateral sizes of a plurality of quantized lateral sizes for the nanostructures corresponds to the number of phase levels to be implemented with respect to single nanostructure-integrated metalens 110. That is, the nanostructures may be provided in a selected number (e.g., 2, 4, 6, 8, 12, 16, etc.) of quantized lateral sizes corresponding to the same number of levels of phase change. For example, in the example of FIGS. 3A and 3B, the number of lateral sizes is 8, providing for lateral size $S_1$ (e.g., nanostructure 112a), lateral size $S_2$ (e.g., nanostructure 112b), lateral size $S_3$ (e.g., nanostructure 112c), lateral size $S_4$ (e.g., nanostructure 112d), lateral size $S_5$ (e.g., nanostructure 112e), lateral size $S_6$ (e.g., nanostructure 112f), lateral size $S_7$ (e.g., nanostructure 112g), and lateral size $S_8$ (e.g., nanostructure 112h), wherein each of lateral sizes $S_1$-$S_8$ corresponds to a lateral size of the respective nanostructure for modifying the phase of incident light a desired amount (e.g., $S_1 \rightarrow \pi/4$, $S_2 \rightarrow \pi/2$, $S_3 \rightarrow 3\pi/4$, $S_4 \rightarrow \pi$, $S_5 \rightarrow 5\pi/4$, $S_6 \rightarrow 3\pi/2$, $S_7 \rightarrow 7\pi/4$, and $S_8 \rightarrow 2\pi$). According to another example, the number of lateral sizes may be 4, providing for lateral sizes $S_1$, $S_2$, $S_3$, and $S_4$, wherein each of lateral sizes $S_1$-$S_4$ corresponds to a lateral size of the respective nanostructure for modifying the phase of incident light a desired amount (e.g., $S_1 \rightarrow \pi/2$, $S_2 \rightarrow \pi$, $S_3 \rightarrow 3\pi/2$, and $S_4 \rightarrow 2\pi$). It should be appreciated that the particular sizes implemented to provide the desired phase level modifications may vary based upon aspects of the specific nanostructure implementation, such as the material, height, etc., utilized for the nanostructures (e.g., refractive index). According to some examples of the invention, the lateral sizes may be selected to fall within a range defined by the period distance of the single nanostructure-integrated metalens (e.g., $P \geq S_x > 0$). The lateral sizes may, for example, be in the range of 100-400 nm in some examples of providing structured light for 3D or depth sensing. The particular value for the lateral sizes may, for example, be selected according to some examples based upon considerations such as the desired or acceptable performance of single nanostructure-integrated metalens 110, ease or difficulty of fabrication of the single nanostructure-integrated metalens, etc. In accordance with embodiments of the invention, the nanostructures are configured to have the same spatial resolution in x and y axes.

Block 220 of flow 200 illustrated in FIG. 2 provides operations for selecting or otherwise determining mapping of integrated nanostructures for implementing projector and light shaper functionality by single nanostructure-integrated metalens 110 to provide one or more desired light patterns. For example, at block 221 of the illustrated embodiment a phase map (e.g., a first phase map) for structured light generation by single nanostructure-integrated metalens 110 is determined. At block 222 of the illustrated embodiment a phase map (e.g., a second phase map) for concentration and/or collimation of light is determined. At block 223 of the illustrated embodiment, phase maps provided at blocks 221 and 222 (e.g., structured light phase map and collimation light phase map, respectively) are fused to define a preconfigured mapping for the nanostructures of single nanostructure-integrated metalens 110 providing desired spatial pattern of optical phase changes (e.g., phase rotation or offset) with respect to incident light.

Figure 4A:
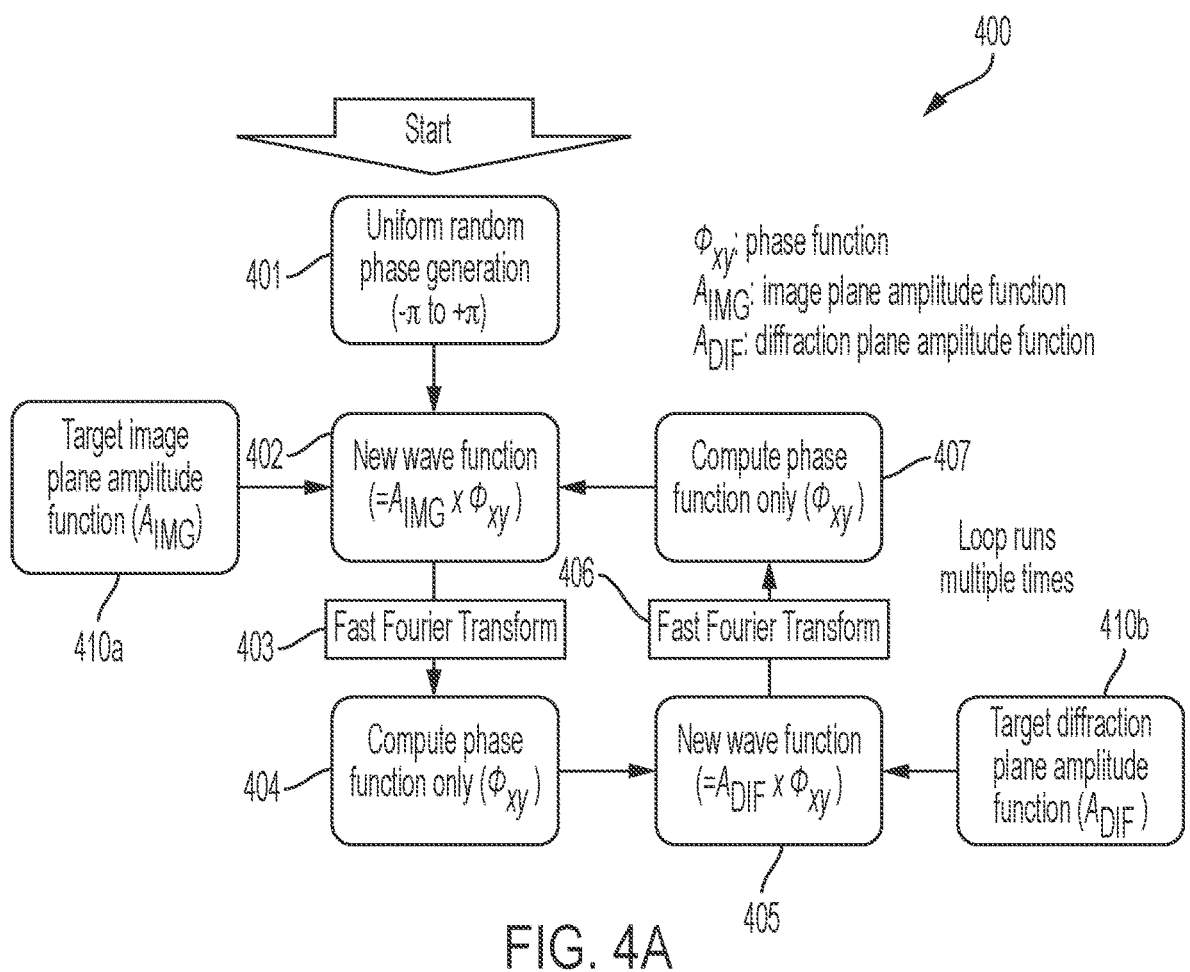
FIG. 4A is a flow diagram implementing an inverse calculation iterative Fourier-transform algorithm (IFTA) for computing a first phase map for structured light generation by single nanostructure-integrated metalens according to embodiments of the invention.

A first phase map ($\Phi_1(x,y)$) utilized according to examples is a phase distribution, as may be implemented using nanostructures 112, for providing structured light of a desired or target image to be generated by single nanostructure-integrated metalens 110. In operation according to block 221 of embodiments of the invention, the phase distribution is inverse designed (e.g., inverse designed phase distribution), such as using an inverse calculation iterative Fourier-transform algorithm (IFTA). FIG. 4A shows a flow diagram implementing an inverse calculation IFTA for computing a first phase map for structured light generation by single nanostructure-integrated metalens 110 according to some embodiments of the invention. In particular, flow 400 of FIG. 4A provides exemplary operations as may be utilized at block 221 of flow 200 in determining a phase map for structured light generation by single nanostructure-integrated metalens 110. In operation according to the example of flow 400, an inverse phase design technique is implemented with respect to a desired or target image, such as target image 410 of FIG. 4B, to compute a first phase map of embodiments.

Figure 4B:
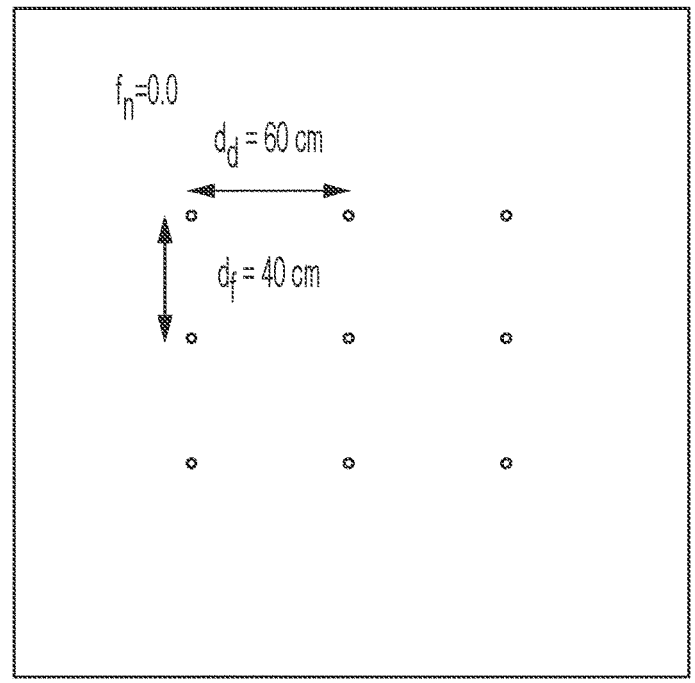
FIG. 4B is an example target images according to embodiments of the invention.
Figure 4C:
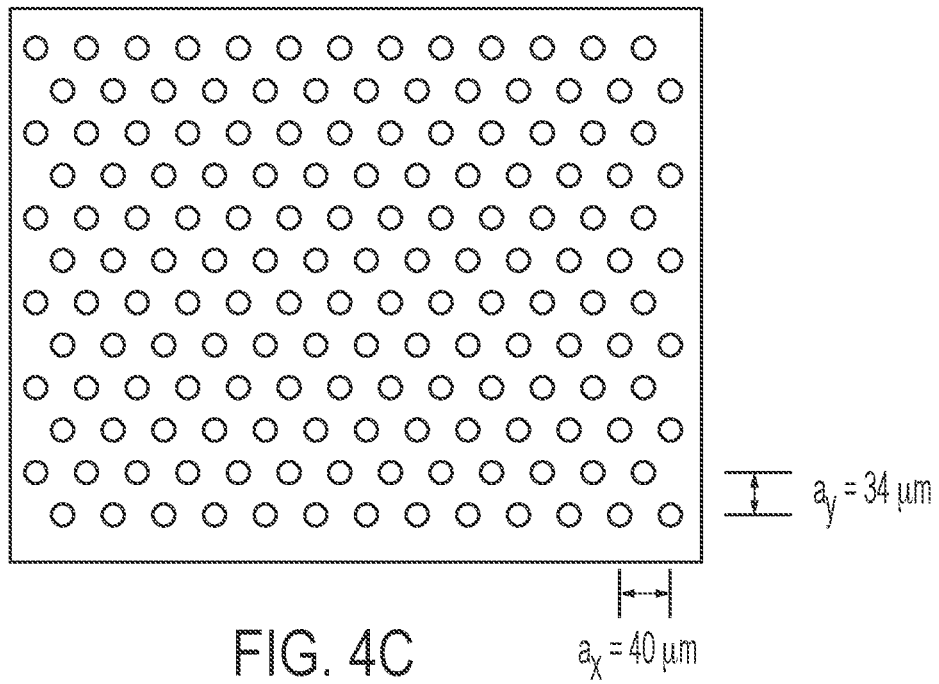
FIG. 4C is an example light source distribution according to embodiments of the invention.

In the example of FIG. 4B, target image 410 comprises a predetermined or desired pattern of dots (e.g., dot pattern of projected light at the near infrared region) to be generated by single nanostructure-integrated metalens 110. The pattern of dots may be defined using various variables, such as for distance, offset, etc. For example, the distance variable $d_x$ may define the distance between adjacent dots in the same row, the distance variable $d_y$ may define the distance between adjacent dots in column, and the offset distance $f_m$ (e.g., a value between 1 and −1) may define the lateral shift of alternate rows (e.g., even numbered rows or odd numbered rows) by $f_m * d_x$. In the example of target image 410 illustrated in FIG. 4B, $d_x$=60 cm, $d_y$=40 cm, and $f_m$=0.0. It should be appreciated that the foregoing distance variables are exemplary, and that embodiments of the invention may utilize different values for $d_x$ and/or $d_y$ (e.g., $d_x$ and $d_y$ may each be any value in the range of 1-60 cm in some examples of providing structured light for 3D or depth sensing). FIG. 4C shows an example of a light source distribution with a similar set of parameters ax and ay, having a non-zero offset distance (e.g., $f_m$=0.5). Information regarding such a target image may be provided as an input to flow 400 for computing a first phase map ($\Phi_1(x,y)$) with respect to nanostructures 112 of single nanostructure-integrated metalens 110 according to embodiments.

In operation according to the inverse phase design technique implemented by the operations of flow 400, an initial or seed phase function is utilized for convergence to the first phase map from repeating a computational loop of the IFTA. Accordingly, at block 401 of the illustrated example, a uniform or random phase function (e.g., a random or uniform distribution of phase levels from 0-2π) is generated for use in the computational loop comprising blocks 402-407 of flow 400.

At block 402, the first iteration of the computational loop comprising blocks 402-407 is initiated for computing a first phase map ($\Phi_1(x,y)$) with respect to nanostructures 112 of single nanostructure-integrated metalens 110. In operation according to block 402 of the illustrated embodiment, a new wave function is computed from an image plane amplitude function (e.g., $A_{IMG}$) for the target image and the initial or seed phase function (e.g., upon a first iteration of the IFTA computational loop $\Phi x,y$=the seed phase function). Accordingly, the initial or seed phase function (e.g., Φx,y) and an image plane amplitude function ($A_{IMG}$) for the target image are input at block 402, wherein the seed phase function is in initial input only (e.g., an input of the first iteration of the computational loop). Target image plane amplitude function 410a of embodiments comprises a mapping of light amplitude in the image plane of target image 410. The new wave function may, for example, be computed as a product of target image plane amplitude function 410a and the seed phase function (e.g., new wave function=$A_{IMG}$*Φx,y).

A fast Fourier transform is performed at block 403 on the new wave function computed at block 402 of the illustrated embodiment. Using the results of the fast Fourier transform from block 403, a phase function (e.g., phase only phase function Φx,y) is computed at block 404.

In operation according to block 405 of the illustrated embodiment, a new wave function is computed from a diffraction plane amplitude function (e.g., $A_{DIF}$) for the target image and the phase function (e.g., Φx,y as computed at block 404). Accordingly, a diffraction plane amplitude function ($A_{DIF}$) for the target image is input at block 405. Target diffraction plane amplitude function 410b of embodiments comprises a mapping of light amplitude in the diffraction plane of target image 410. The new wave function may, for example, be computed as a product of target diffraction plane amplitude function 410b and the phase function (e.g., new wave function=$A_{DIF}$*Φx,y).

A fast Fourier transform is performed at block 406 on the new wave function computed at block 405 of the illustrated embodiment. Using the results of the fast Fourier transform from block 406, a phase function (e.g., phase only phase function Φx,y) is computed at block 407.

In operation according to the example implementation of the computational loop comprising blocks 402-407, the computational loop is run multiple times (e.g., 50 to 100 times) to converge the phase function (Φx,y) to the first phase map ($\Phi_1(x,y)$). For example, according to some embodiments of the invention, $\Phi_1(x,y)$=Φx,y (e.g., Φx,y as computed at block 407) of a last iteration of the computational loop. Accordingly, in operation of the example of flow 400, a next iteration of operation at block 402 of the computational loop follows the computation of the phase function at block 407 of the illustrated embodiment. At subsequent iterations of block 402, a new wave function is computed from the image plane amplitude function (e.g., $A_{IMG}$) for the target image and the phase function (e.g., Φx,y as computed at block 407). Accordingly, the image plane amplitude function ($A_{IMG}$) for the target image is again provided at block 402 and the new wave function may again be computed as a product of target image plane amplitude function 410a and the phase function (e.g., new wave function=$A_{DIF}$*Φx,y). Similarly, at subsequent iterations of block 405, a new wave function is computed from the diffraction plane amplitude function (e.g., $A_{DIF}$) for the target image and the phase function (e.g., Φx,y as computed at block 404). Accordingly, the diffraction plane amplitude function ($A_{DIF}$) for the target image is again provided at block 405 and the new wave function may again be computed as a product of target diffraction plane amplitude function 410b and the phase function (e.g., new wave function=$A_{DIF}$*Φx,y).

After completion of multiple runs of the computational loop of the IFTA in flow 400, the first phase map ($\Phi_1(x,y)$) is quantized and provided for use with respect to single nanostructure-integrated metalens 110. For example, quantization may be applied to the phase map for the number of phase levels to be implemented (e.g., 2, 4, 6, 8, 12, 16, etc.) to adapt the phase mapping to the different lateral sizes for the nanostructures. In particular, the first phase map ($\Phi_1(x,y)$) determined by operation of flow 400 of embodiments may provide a phase distribution with respect to nanostructures 112 for providing structured light of target image 410 to be generated by single nanostructure-integrated metalens 110.

Figure 5A:
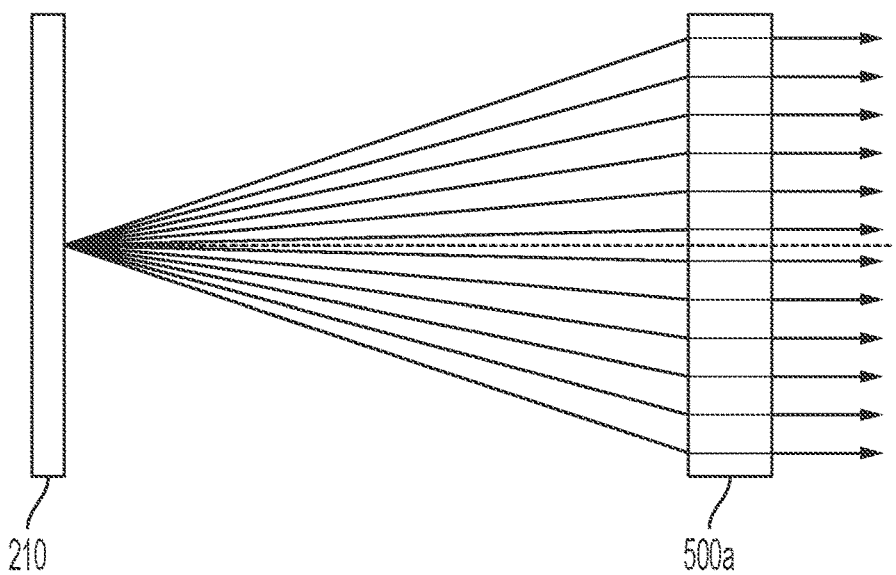
FIG. 5A illustrates a columniation function with respect to a single light source implementation of a light emission device according to embodiments of the invention.
Figure 5B:
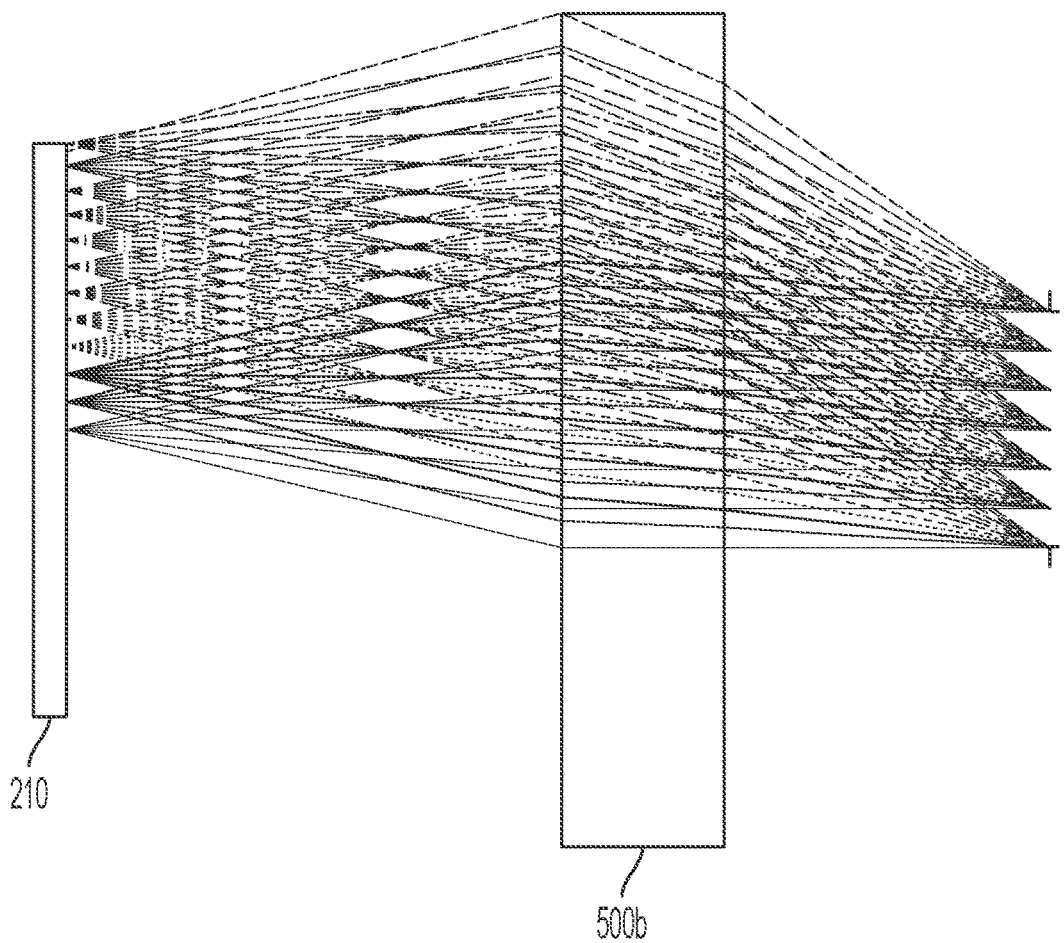
FIG. 5B illustrates a columniation function with respect to a multiple light source implementation of a light emission device according to embodiments of the invention.

A second phase map ($\Phi_2(x,y)$) utilized according to examples is a phase distribution, as may be implemented using nanostructures 112, for providing concentration and/or collimation of light by single nanostructure-integrated metalens 110. Light sources, such as the one or more light sources of light emission device 120, usually emit divergent light. Accordingly, embodiments of single nanostructure-integrated metalens 110 are configured to provide collimator/concentrator functionality for phase focusing the inclined light to a nanostructure layer of the single nanostructure-integrated metalens. The phase distribution of a second phase map according to embodiments may, for example, a provide columniation function (e.g., columniation 500a of FIG. 5A) with respect to a single light source implementation of light emission device 120. Similarly, the phase distribution of a second phase map according to embodiments may, for example, a provide columniation function (e.g., columniation 500b of FIG. 5A) with respect to a multiple light source implementation of light emission device 120. In operation according to block 222 of embodiments of the invention, a second phase map ($\Phi_2(x,y)$) may be computed with respect to light collimation using a phase focusing design technique (e.g., diffractive phase function) according to some examples. For example, calculations for phase focusing light to a nanostructure layer of a single nanostructure-integrated lens may be binary diffractive designed, such as based on the Binary2 lens phase function $\Phi_2 = M \sum_{i=1}^{N} A_i p^{2i}$ using an optical design program (e.g., ZEMAX).

The illustrated embodiment of flow 200 provides for fusion of a plurality of phase maps to define a preconfigured mapping for the nanostructures of single nanostructure-integrated metalens 110 providing desired spatial pattern of optical phase changes with respect to incident light. In operation according to block 223 of embodiments of the invention, the first phase map ($\Phi_1(x,y)$) determined at block 221 and the second phase map ($\Phi_2(x,y)$) determined at block 222 are fused to compute or otherwise determine a preconfigured mapping (Φ(x,y)) for the nanostructures of single nanostructure-integrated metalens 110. According to some examples, fusion of the phase maps comprises combining two functions for structured light and collimation based upon the first and second phase mapping. For example, the two functions may be combined by the convolution of the surface function $A(x,y)e^{i\Phi(x,y)} = A_1(x,y)e^{i\Phi_1(x,y)} * A_2(x,y)e^{i\Phi_2(x,y)}$. It can be seen that the each of the first and second phase maps are in the exponential components of the foregoing surface function. Accordingly the multiplication may be changed to a sum, such that $\Phi(x,y)=\Phi_1(x,y)+\Phi_2(x,y)$.

The foregoing exemplary operation according to flow 200 provides for determining corporeal aspects and a phase map ((Φ(x,y)) with respect to nanostructures for providing an implementation of single nanostructure-integrated metalens 110 configured to provide both light collimation functionality and structured light projection functionality (e.g., corresponding to target image 410) in accordance with embodiments of the invention. The determined phase map may, for example, be utilized in integrating nanostructures having the determined corporeal aspects upon an optical substrate to provide an embodiments of single nanostructure-integrated metalens 110 in accordance with concepts herein. For example, techniques such as photolithography, soft lithography, laser ablation, chemical self-assembly, roll-to-roll nanoimprinting, etc. may be utilized in integrating nanostructures providing phase distribution according to the determined phase map and having the determined corporeal aspects with an optical substrate to provide an instance of single nanostructure-integrated metalens 110. As a specific example for structured light projection of light having a near infrared center wavelength (e.g., λc=940 nm), nanostructures comprised of silicon (e.g., n=3.71) may be integrated on an optical glass substrate according to a phase distribution of the phase map (e.g., (Φ(x,y)) determined with respect to target image 410 and having a height of 490 nm (e.g., H=490 nm), a period distance of 500 nm (e.g., P=500 nm) maintained with respect to adjacent nanostructures, and implementing 4 quantized lateral sizes (e.g., $S_1 \rightarrow \pi/2$, $S_2 \rightarrow \pi$, $S_3 \rightarrow 3\pi/2$, and $S_4 \rightarrow 2\pi$), for use as a single nanostructure-integrated metalens configuration to be utilized as a projector and light shaper of a 3D sensing apparatus.

An instance of single nanostructure-integrated metalens 110 configured to provide both light collimation functionality and structured light projection functionality (e.g., corresponding to target image 410) using corporeal aspects and phase map determined according to the operations of embodiments of flow 200 may, for example be utilized in providing an implementation of projector device 100 in accordance with concepts of the invention. The instance of single nanostructure-integrated metalens 110 may, for example, be oriented with nanostructures 112 integrated on a side of optical substrate 111 facing light emission device 120, and having support structure 130 position the lens plane of single nanostructure-integrated metalens 110 a distance from the light plane of light emission device 120 corresponding to the focal length (e.g., 1.1 nm) of a light concentration and/or collimation function of the metalens (e.g., focal length of the second phase map ($\Phi_2(x,y)$) providing concentration and/or collimation of light with respect to the single nanostructure-integrated metalens). The resulting instance of projector device 100 may, for example, be utilized for generating one pattern (e.g., dot pattern) corresponding to target image 410 in an implementation in which light emission device 120 comprises one light source. Similarly, the resulting instance of projector device 100 may be utilized for generating multiple instances of a pattern (e.g., multiple instances of a dot pattern with a shift in the far field corresponding to the relative placement of the light sources) corresponding to target image 410 in an implementation in which light emission device 120 comprises multiple light sources.

Although the present disclosure and its advantages have been described in detail, it should be understood that various changes, substitutions and alterations can be made herein without departing from the spirit and scope of the design as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A metalens comprising:
   an optical substrate having a transparent spectral range of at least 50 nm corresponding to an operation wavelength of a light emission device to be used with the metalens; and
   a plurality of nanostructures integrated on at least one surface of the optical substrate in accordance with a phase distribution of a phase mapping configured for providing both light collimation functionality and structured light projection functionality, wherein the nanostructures are provided in at least 4 quantized lateral sizes and are spaced according to a period distance (P), wherein P is in a range from ($\lambda_c$*0.8)/2 to ($\lambda_c$*1.2)/2, and wherein $\lambda_c$ is an operation wavelength region of the metalens.

2. The metalens of claim 1, wherein the plurality of nanostructures each have a same height (H), and wherein H in a range from $\lambda_c/10$ to $\lambda_c$.

3. The metalens of claim 1, wherein the plurality of nanostructures comprise a material having a refractive index with respect the operation wavelength region of the metalens not smaller than 1.5.

4. The metalens of claim 1, wherein the plurality of nanostructures comprise a plasmonic metallic material.

5. The metalens of claim 1, wherein the phase mapping is provided at least in part by an inverse calculation iterative Fourier transform algorithm (IFTA) based on a target image, and the phase mapping is provided at least in part based on a calculation for phase focusing light to a nanostructure layer of the plurality of nanostructures.

6. The metalens of claim 5, wherein the inverse calculation IFTA based on the target image utilizes a distance between adjacent dots in a first axis ($d_x$) of a plane of the target image, a distance between adjacent dots in a second axis ($d_y$) of the plane of the target image, and an offset distance ($f_m$) of lateral shift between alternate rows of dots of the target image, wherein the first axis and the second axis are perpendicular.

7. The metalens of claim 1, wherein the nanostructures are provided in 4 or 8 quantized lateral sizes.

8. The metalens of claim 7, wherein the nanostructures are provided in 4 quantized lateral sizes corresponding to 4 levels of phase change, wherein the 4 levels of phase correspond to phase changes of $\pi/2$, $\pi$, $3\pi/2$, and $2\pi$, and wherein the nanostructures are configured to have a same spatial resolution in x and y axes.

9. The metalens of claim 1, wherein the metalens is disposed in a support structure of a projector device including the light emission device, the support structure, and the metalens, and wherein the metalens is oriented in the support structure so that a first surface of the at least one surface of the optical substrate having nanostructures of the plurality of nanostructures integrated thereon faces the light emission device.

10. A method for providing a metalens configured for providing both light collimation functionality and structured light projection functionality, the method comprising:
    determining corporeal aspects with respect to nanostructures for a particular configuration of a single nanostructure-integrated metalens comprising the metalens, wherein the corporeal aspects include a period distance (P) with respect to the nanostructures and sizes with respect to the nanostructures, wherein the period distance comprises a row-to-row and column-to-column center distance implemented with respect to adjacent ones of the nanostructures, and wherein the sizes provide at least 4 quantized lateral sizes for the nanostructures corresponding to levels of phase change to be implemented by the nanostructures;

determining a mapping of the nanostructures for integration upon a surface of an optical substrate of the metalens implementing projector and light shaper functionality by a single nanostructure-integrated metalens comprising the metalens, wherein determining the mapping of the nanostructures comprises:

determining a structured light phase map using an inverse designed phase distribution based upon a target image;

determining a collimation light phase map using a phase focusing design technique; and fusing the structured light phase map and the collimation light phase map to provide a preconfigured mapping for the nanostructures for the single nanostructure-integrated metalens providing desired spatial pattern of optical phase changes according to the mapping of the nanostructures; and integrating the nanostructures having the corporeal aspects upon the optical substrate according to the mapping to provide the metalens for use as the single nanostructure-integrated metalens.

11. The method of claim 10, wherein P is in a range from $(\lambda_c*0.8)/2$ to $(\lambda_c*1.2)/2$, and wherein $\lambda_c$ is an operation wavelength region of the metalens.

12. The method of claim 11, further comprising:
determining a height (H) of the nanostructures, wherein H in a range from $\lambda_c/10$ to $\lambda_c$ and the height of each of the nanostructures is a same value of H.

13. The method of claim 10, wherein determining the structured light phase map uses an inverse calculation iterative Fourier-transform algorithm (IFTA) based on the target image.

14. The method of claim 13, wherein determining the collimation light phase map uses a binary diffractive phase function.

15. The method of claim 14, wherein fusing the structured light phase map and the collimation light phase map uses a convolution of a surface function.

16. The method of claim 10, further comprising:
disposing the metalens in a support structure of a projector device including a light emission device, the support structure, and the metalens, wherein the metalens is oriented in the support structure so that a first surface of the optical substrate having the nanostructures integrated thereon faces the light emission device.

17. A light projector apparatus comprising:
a single nanostructure-integrated metalens, wherein the single nanostructure-integrated metalens comprises:
an optical substrate having a spectral range of at least 50 nm corresponding to an operation wavelength of a light emission device to be used with the single nanostructure-integrated metalens; and
a plurality of nanostructures integrated on at least one surface of the optical substrate in accordance with a phase distribution of a phase mapping configured for providing both light collimation functionality and structured light projection functionality, wherein the nanostructures are provided in at least 4 quantized lateral sizes and are spaced according to a period distance (P), wherein P is in a range from $(\lambda_c*0.8)/2$ to $(\lambda_c*1.2)/2$, and wherein $\lambda_c$ is an operation wavelength region of the single nanostructure-integrated metalens;

the light emission device having one or more light sources configured to provide emission of light in a light emission plane of the light emission device, wherein the one or more light sources emit light having a center wavelength of $\lambda_c$; and a support structure configured to hold the single nanostructure-integrated metalens in a desired predetermined relationship with the light emission plane of the light emission device, wherein the support structure is configured to hold the single nanostructure-integrated metalens oriented in the support structure so that a first surface of the optical substrate having nanostructures of the plurality of nanostructures integrated thereon faces the light emission device.

18. The light projector apparatus of claim 17, wherein the light emission device has a plurality of light sources numbering at least 100.

19. The light projector apparatus of claim 17, wherein the desired predetermined relationship the support structure holds the single nanostructure-integrated metalens with respect to the light emission plane of the light emission device is in the range of 1.1 to 1.7 mm above the light emission plane.

20. The light projector apparatus of claim 17, wherein the phase mapping is provided at least in part by an inverse calculation iterative Fourier transform algorithm (IFTA) based on a target image, and the phase mapping is provided at least in part based on a calculation for phase focusing light to a nanostructure layer of the plurality of nanostructures, wherein the inverse calculation IFTA based on the target image utilizes a distance between adjacent dots in a first axis ($d_x$) of a plane of the target image, a distance between adjacent dots in a second axis ($d_y$) of the plane of the target image, and an offset distance ($f_m$) of lateral shift between alternate rows of dots of the target image, wherein the first axis and the second axis are perpendicular.

* * * * *